Figure 1:
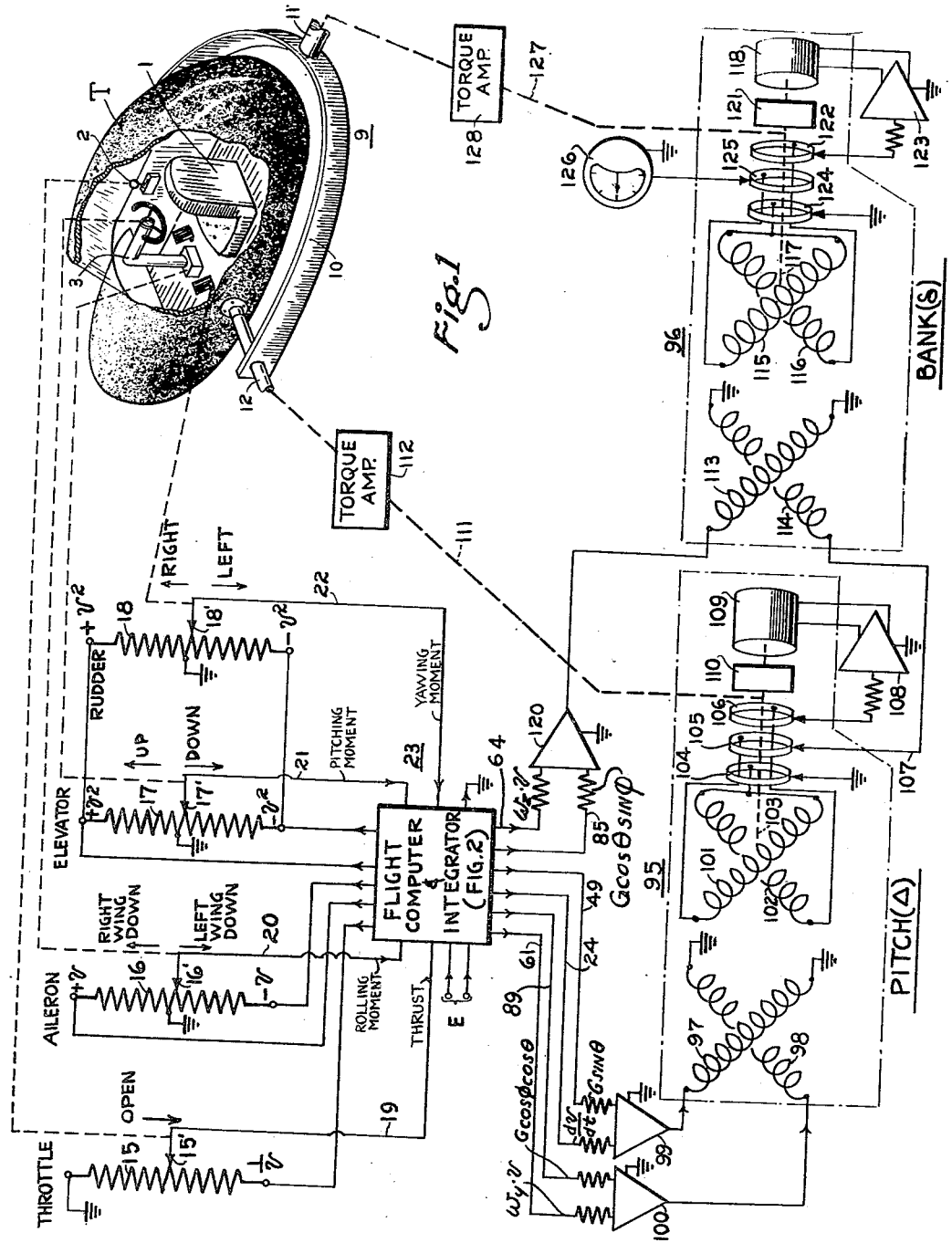

Aug. 31, 1954

R. C. DEHMEL 2,687,580

FLIGHT TRAINING APPARATUS FOR COMPUTING FLIGHT CONDITIONS
AND SIMULATING REACTION OF FORCES ON PILOTS

Filed May 25, 1948

3 Sheets-Sheet 1

INVENTOR.
~RICHARD C. DEHMEL~

BY

*his* ATTORNEY.

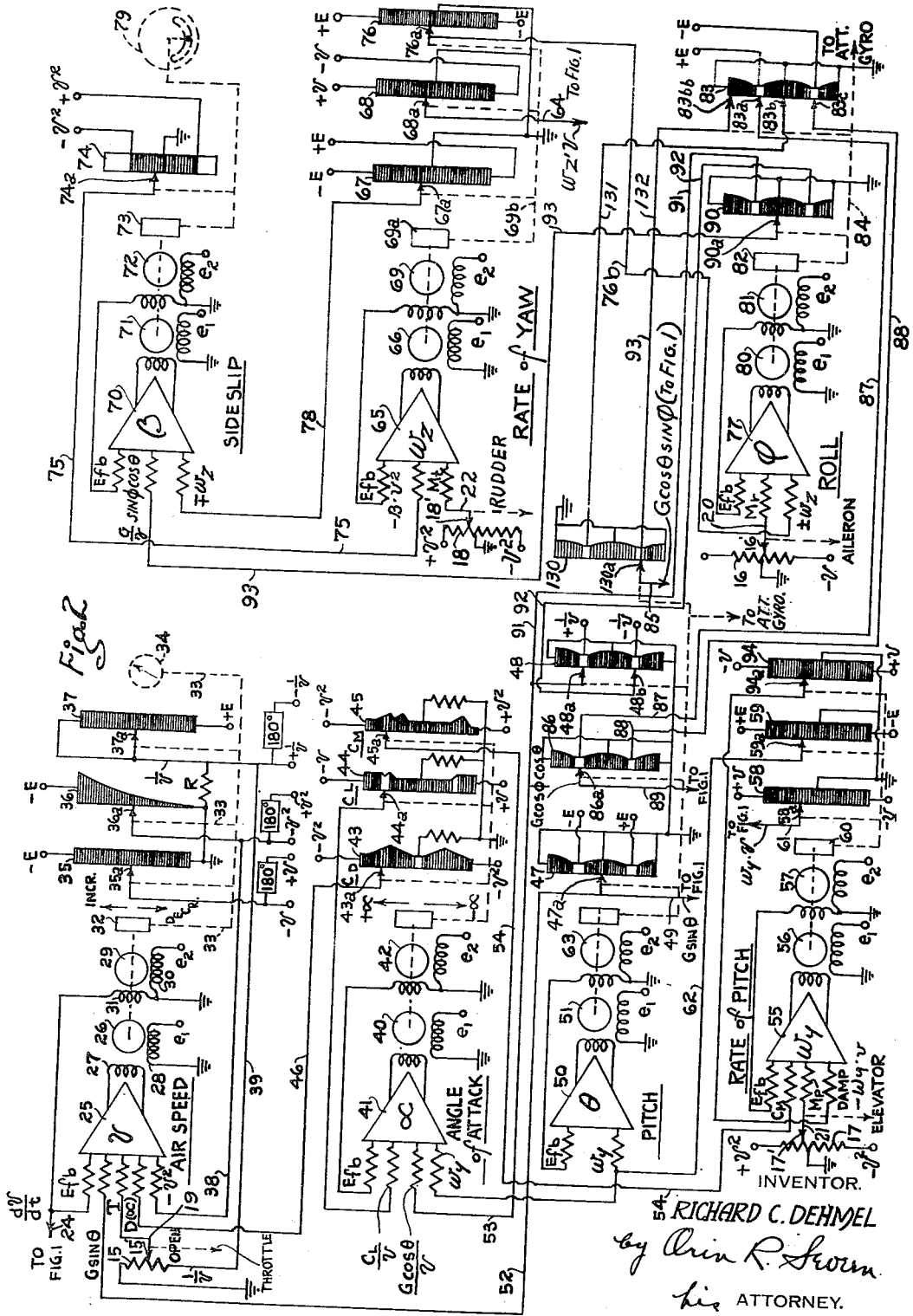

Aug. 31, 1954  R. C. DEHMEL  2,687,580
FLIGHT TRAINING APPARATUS FOR COMPUTING FLIGHT CONDITIONS
AND SIMULATING REACTION OF FORCES ON PILOTS
Filed May 25, 1948  3 Sheets-Sheet 3
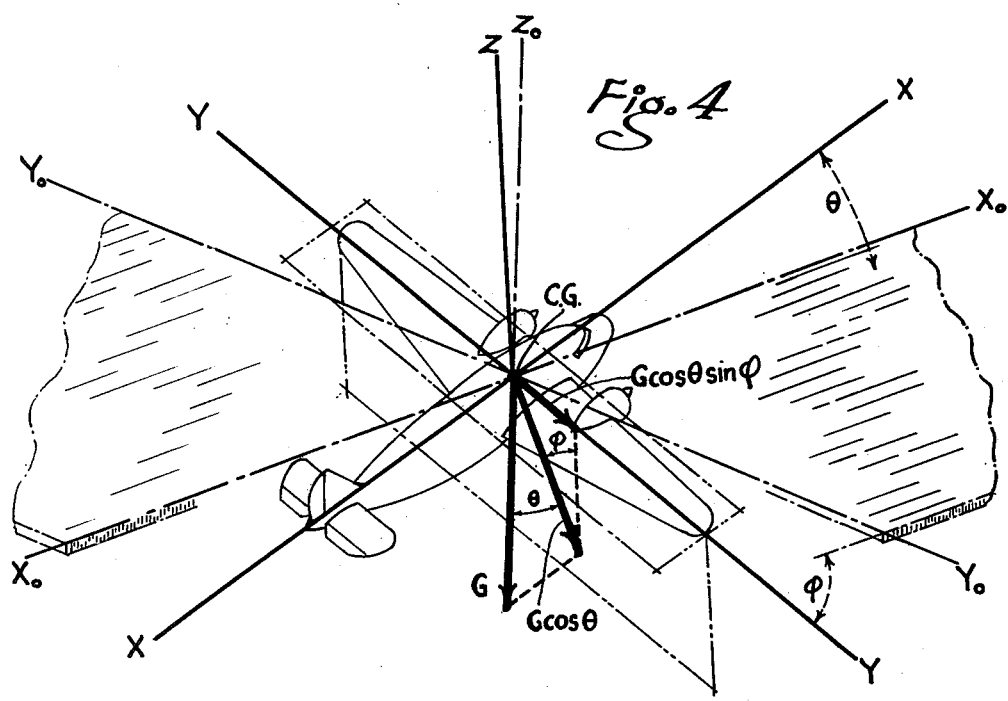
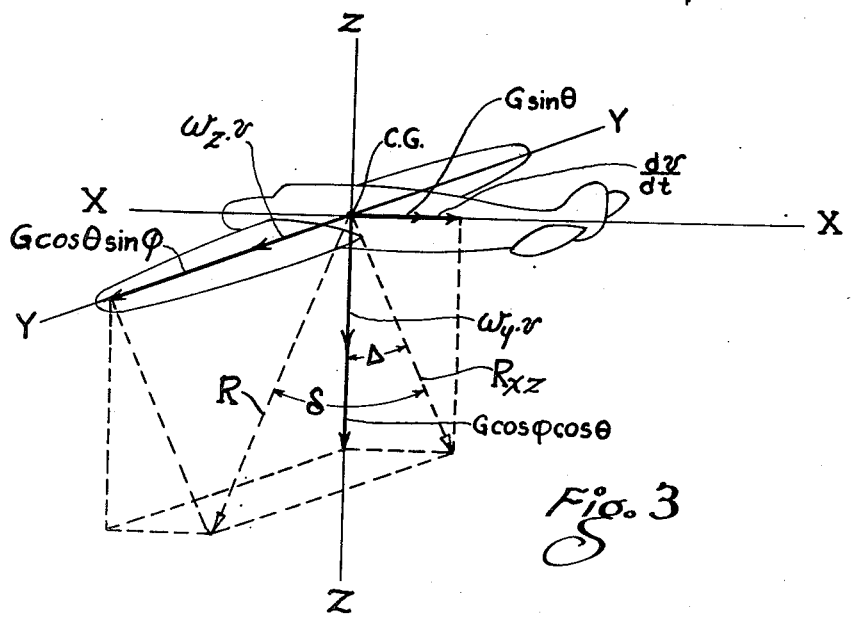
INVENTOR.
~RICHARD C. DEHMEL~
BY
his ATTORNEY.

Patented Aug. 31, 1954

2,687,580

UNITED STATES PATENT OFFICE 2,687,580

FLIGHT TRAINING APPARATUS FOR COMPUTING FLIGHT CONDITIONS AND SIMULATING REACTION OF FORCES ON PILOT

Richard C. Dehmel, Short Hills, N. J.

Application May 25, 1948, Serial No. 29,066

21 Claims. (Cl. 35—12)

This invention relates to flight training apparatus for pilots and particularly to grounded or emplaced apparatus of the aforesaid character for computing flight conditions and simulating force reaction on the pilot that occurs in actual flight while rotating about the three axes of the aircraft during such maneuvers as pitching, banking and turning.

In actual flight the combined effects of gravity, acceleration and centrifugal forces acting on the pilot's body may be represented as a resultant force that acts either in a direction normal to the pilot's seat, as in a perfectly executed banking maneuver wherein the pilot feels that he is sitting normally upright, or at an angle to the seat as in a "side-slip" or "skidding" maneuver wherein the pilot feels that he is tipping in one direction or another. The forces acting on the pilot are in particular those of gravity, centrifugal force due to yawing and centrifugal force due to pitching. It is not sufficient therefore in the case of ground trainers, to simulate the aforesaid maneuvers merely by tipping the trainer fuselage in the general direction of the stick movement since such tipping may be very misleading. For example, in a shallow turn to the left at sufficient speed to cause skidding, centrifugal force is dominant over gravity and the resultant force acting on the pilot gives him the impression that his seat is tipping toward the right instead of toward the left. Also in the case of a perfectly executed banked turn, a tilted position of the seat would give the pilot an entirely wrong impression since in such a turn the normal seat reaction would give the feel of no tilting movement. Similar wrong impressions may also be created in pitch attitudes where for example acceleration during diving may actually give the pilot the feeling that his seat is tipping backward instead of forward, the converse being true during deceleration in a low angle climb.

A principal object therefore of the present invention is to provide improved means for computing flight conditions and simulating in respect to direction the reaction, commonly known as "seat-of-pants" reaction, that occurs during actual flight maneuvers due to combined gravity, acceleration and centrifugal forces acting on the pilot.

Another object of the invention is to provide improved computing and control means responsive to the operation of simulated flight controls for determining the position of the pilot's seat according to a resultant of force vectors derived from simulated flight conditions.

A further and more specific object of the invention is to provide improved electrical computing and control means responsive to the operation of simulated flight controls for obtaining control voltages representing force vectors acting on the pilot and for utilizing said voltages to control the position of the pilot's seat in the training apparatus.

The invention will be more fully set forth in the following description referring to the accompanying drawings, and the features of novelty will be pointed out with particularity in the claims annexed to and forming a part of this specification.

Referring to the drawings,

Fig. 1 is a schematic illustration of an electric computing and control system incorporated in aircraft training apparatus for simulating the direction of force reaction on the pilot;

Fig. 2 diagrammatically illustrates in greater detail the flight computing system of Fig. 1; and Figs. 3 and 4 are vector diagrams illustrating resolution of force vectors.

Referring to Fig. 1 the trainer fuselage T comprising the pilot's station is shown schematically with reference to the associated computing and control equipment of the present invention. The trainer per se may be of any suitable type having a pilot's seat 1 and simulated aircraft controls including a throttle 2, a stick or control column 3 and rudder pedals 4. The respective throttle, aileron, elevator and rudder controls in a preferred form of the invention are operatively connected as diagrammatically indicated to voltage deriving means such as potentiometers 15, 16, 17 and 18 having coacting movable contacts 15', 16', 17' and 18' respectively. The potentiometer contacts may be positioned for voltage derivation according to respective aircraft control operation in the manner illustrated for example in my Patent 2,366,603, granted January 2, 1945, for "Aircraft Training Apparatus." It shall be understood that the invention is also applicable to other types of trainers such as those mounted for rotation in azimuth, without reference to the particular kind of operating medium used.

The pilot's station at T is suitably mounted on a universal coupling 9 for pitching movement about its transverse axis and for rolling or banking movement about its longitudinal axis, these axes being designated the Y and X axes respectively, Fig. 3. By way of example the coupling 9 may consist of a yoke 10 connected to a rotatable shaft 11 that is operable by means hereinafter described for oscillating the yoke for banking movement and a transverse shaft 12, to which the fuselage T is directly secured, rotatably mounted in the yoke and also operable by additional means hereinafter described for pitching movement.

The electrical computing and control system for tilting and pitching the pilot's station so as to simulate direction of the aforesaid "seat-of-pants" reaction during flight maneuvers is illustrated schematically in Fig. 1, the flight computing and integrating system indicated in block schematic form being shown in Fig. 2. For the purpose of simplicity, the terminals of various electrical apparatus of Fig. 2 are indicated as energized from respective voltage sources rather than connected by wires to those sources and it will therefore be understood that terminals designated by like symbols are connected together.

Referring to Fig. 1, a reference alternating current voltage source E is used for energizing the complete system and the various derived and control voltages are obtained from this source, it being understood that the positive and negative indications represent instantaneous polarity with respect to the reference source. For example the various aircraft control potentiometers are energized by voltages representing certain functions of air speed ($v$) obtained from the computing system. The throttle potentiometer 15 is energized as indicated at its lower terminal by a voltage representing the reciprocal of air speed ($1/v$) and grounded at its upper terminal so that the derived voltage from sliding contact 15' as the throttle is adjusted represents thrust (T) according to the relationship $T=hp/v$. The elevator and rudder potentiometers 17 and 18 respectively are each energized at their upper terminals by a positive voltage ($+v^2$) and at their lower terminals by a negative voltage ($-v^2$) representing the squared value of air speed. The aileron potentiometer 16 is energized by a voltage ($v$) corresponding linearly to airspeed. Also each potentiometer is provided with a grounded center tap for simulating positive and negative turning moments about the conventional aircraft axes, Fig. 3, with respect to a normal level flight position. The various derived moment voltages from the control potentiometers 15, 16, 17 and 18 are fed by conductors 19, 20, 21 and 22 to the computing system generally indicated at 23 from which control voltages are obtained for operating the pitch and bank apparatus of the trainer T above referred to.

The flight computing and integrating apparatus as shown by Fig. 2 will now be described. The apparatus as shown comprises essentially seven servo units, each representing a flight condition such as air speed, angle of attack, rate of pitch, etc. interconnected in an interacting electro-mechanical network so as to operate according to certain flight principles for simultaneously and continuously computing the respective flight condition. For the purpose of clarity the interrelating circuits of the servo units illustrated are simplified to an extent sufficient to teach the invention. A flight computing system of this character is disclosed in greater detail and is claimed in my copending application, Serial No. 777,414, filed October 2, 1947, for "Flight Computing System and Apparatus."

Primarily in the operation of the present system, voltages are derived in accordance with the operation of the above described simulated aircraft controls proportional to the various velocities and forces that produce motion or acceleration with respect to three reference axes according to fundamental aerodynamic principles. The three reference axes referring to Figs. 3 and 4 are (1) the longitudinal or $x$ axis of the aircraft (2) an axis $y$ along the plane of the wings perpendicular to the longitudinal axis and (3) an axis $z$ mutually perpendicular to the other two, all axes intersecting the center of gravity of the aircraft.

Translation and rotation with respect to these axes and with respect to fixed axes mutually perpendicular and parallel to the horizon are determined by the servo systems. In one of these systems forces are computed to determine air speed, in another servo system moments are computed to produce rate of yaw, and in a third moments are computed to produce rate of pitch. A pair of auxiliary servos are provided to represent angle of attack and side-slip respectively, the angle of attack servo integrating velocities about the $y$ axis for the purpose of computing aerodynamic quantities of lift (weight plus centrifugal force) drag and pitching moment, and the side-slip servo computing the angle between the plane of symmetry of the aircraft and the flight path. The remaining two servos function to integrate angular motions according to control voltages produced by the three servos above referred to, for representation of the flight conditions roll and pitch.

According to well known principles of aerodynamics, air speed ($v$) is a function of engine thrust (T) which is always positive (except for propeller drag when idling in flight below about 1200 R. P. M.), gravity (G) which may be either positive or negative depending on whether the aircraft is in a dive or climb attitude, and drag which is of course negative. Drag may be considered as having two components, constant coefficient drag which varies as the square of the air speed ($v^2$), and another drag component dependent on the variable coefficient $C_D(\alpha)$ which varies with the angle of attack ($\alpha$), i. e. the angle between the chord of the wing and the air stream.

Referring now to Fig. 2, it will be assumed that a plurality of A. C. voltages representing various values of thrust, gravity and drag respectively, according to the instantaneous polarity and magnitude of the respective voltage are fed separately into a summing amplifier diagrammatically indicated at 25 included in a servo system designated "air speed." Such amplifiers are well known in the art for algebraically summing a plurality of separate A. C. voltages of varying magnitude and polarity, and a detailed circuit illustration is therefore unnecessary. The output of the amplifier 25 is used to control an automatic balancing servo network including a two-phase motor 26, the control phase 27 of which is energized by the amplifier output as illustrated and the other phase 28 by a constant reference A. C. voltage $+e_1$. The operation of this type of motor is well known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the control voltage. The motor drives a two-phase feed-back generator 29 also having one phase 30 energized by an A. C. reference voltage $+e_2$, the other phase 31 generating according to the motor speed a feed-back voltage $E_{fb}$ for purposes of rate control hereinafter described. The feed-back voltage $E_{fb}$ represents $$\frac{dv}{dt}$$

i. e. acceleration, and in addition to being an input for the amplifier 25 is led by conductor 24 to the apparatus of Fig. 1 for use as hereinafter described. The motor also serves to gang-operate through a gear reduction train 32 and suitable mechanical connections indicated by dotted lines 33 the contacts of a potentiometer system and also the pointer of an air speed meter 34.

The individual potentiometer resistance elements 35, 36 and 37 may be of the well-known wound card type and are of circular or band form in practice but are diagrammatically illustrated in a plane development for clearness. A structural arrangement that may be conveniently used for a servomotor and potentiometer combination of the character above referred to is shown by Patent No. 2,431,749, issued December 2, 1947, to R. B. Grant for "Potentiometer Housing and Positioning Structure."

It will therefore be apparent that operation of the motor 26 in either direction causes not only a corresponding change in air speed reading but also causes the potentiometer slider contacts 35a, 36a and 37a to move to corresponding angular positions on the respective potentiometer elements for deriving, i. e. selecting or picking off, potentiometer voltages dependent on the respective contact position. Each potentiometer is shaped or contoured so that the value of the derived voltage at the potentiometer contact bears a certain relationship to the linear movement of the slide contact depending on the particular function of the potentiometer, and has a voltage impressed across its terminals depending as to instantaneous polarity and magnitude also on the function of the potentiometer. According to the present invention the contour of all functional potentiometers represents the derivative of the function represented. For example, the potentiometers 35 and 37, Fig. 2, are of the linear type whereas the potentiometer 36 is contoured to represent a relationship $x=y^2$, where $x$ represents the linear movement of the contact and $y$ represents the derived potentiometer voltage, in the present instance air speed squared.

Stated more specifically, the contour or width variation and therefore the resistance distribution of the various potentiometers used to derive voltages simulating aircraft characteristics is proportional to the derivative of the function of the respective characteristic with respect to the variable represented by the setting of the potentiometer. For example, let it be assumed that the function is a linear one as where a derived voltage is to be directly proportional to the distance that the servo operated potentiometer contact is from a zero position. The slope of the function curve then is the constant ratio of derived voltage to increase in the independent variable represented by the contact travel from the zero position. The derivative of this relationship is the same for all contact settings so that the width of the card is uniform, making it rectangular in shape. If now the function varies according to a square law such as $x=y^2$ the derivative of this equation $f(x)=2y$ determines the width of the potentiometer. Therefore the potentiometer has a straight line sloping edge giving it a wedge shape.

In another case where a cosine function is involved, the derivative or slope of the cosine curve may be expressed as $$\frac{d(\cos\theta)}{d\theta}=-\sin\theta$$

where $\theta$ is the angle measured in radians. Accordingly the contour of the potentiometer card for corresponding values of $\theta$ is sine shaped, the negative value being taken care of by corresponding selection of the polarity applied to the potentiometer. Conversely where a sine function is involved the potentiometer card for corresponding values of $\theta$ will have a cosine contour.

Referring again to Fig. 2, the potentiometer 36 is energized at its upper terminal representing maximum air speed by a negative voltage $-E$ from the reference source and is grounded at its lower end so that the derived voltage at the slider contact 36a represents $-v^2$ and therefore is also representative of the constant coefficient drag previously referred to. Contact 36a is connected by conductor 38 to the input of amplifier 25. Accordingly, this voltage is used as one of the inputs of the air speed summing amplifier tending to oppose the positive thrust voltage (T), the arrangement being such that when the effect of all amplifier input voltages is to balance out, i. e. as during a period of no change in air speed, the output of the amplifier is zero and the motor 26 is deenergized. Any change in the input voltages tending to unbalance the system, either in a positive or negative direction, such as a change in throttle setting when the thrust and drag voltages are unequal, causes operation of the motor 26 in a corresponding direction to move the potentiometer contacts toward a new balance position whereby newly derived voltages tend to restore balance of the motor inputs.

For the purpose of deriving a voltage proportional to air speed $v$, the linear potentiometer 35 is energized by a voltage $-E$ and the slider contact 35a is positioned according to the magnitude of air speed. This derived voltage is used in another part of the system to be described.

The thrust voltage is shown as derived from the setting of the engine throttle potentiometer 15, Figs. 1 and 2, the contact 15' of which is directly adjusted by the pilot to simulate throttle control. This potentiometer is energized (conductor 39) by a voltage taken from the contact 37a of potentiometer 37 that is also energized at its lower terminal by a voltage $+E$; the upper terminal being grounded through a resistance R and also directly connected to contact 37a for deriving a voltage proportional to the reciprocal of air speed $$\frac{1}{v}$$

so as to correspond with the relationship $$T=\frac{H.\ P.}{v}$$

which is simply the basic equation $$H.\ P.=\frac{ft.-lb.}{sec.}=vT$$

It will therefore be seen that the thrust input voltage corresponds generally to the delivered engine power as determined by throttle setting and air speed.

The drag coefficient input $C_D$ varies, as above indicated, with the angle of attack $\alpha$. Accordingly another servo system designated "angle of attack" is provided for deriving a set of voltages corresponding to certain factors variable with angle of attack. A two-phase motor 40 (similar to motor 26) of the angle of attack system is energized by the output of a summing amplifier 41 in the manner above described for driving a feed-back generator 42 and for gang-operation of the contacts 43a, 44a and 45a of potentiometers 43, 44 and 45 respectively. These potentiometers are for the purpose of calculating drag, the rate of change of $\alpha$ due to change in lift and the pitching moment respectively. The inputs of the $\alpha$ amplifier 41 include voltages which are a function of gravity (G), lift ($C_L$) and pitching moment. These inputs will be explained shortly.

The drag as related to angle of attack may be expressed as $$D = C_D(\alpha)\rho\frac{v^2 s}{2}$$

where D is the drag in pounds, $\rho$ is the density of air, $C_D(\alpha)$ is the drag coefficient and S is the projected wing area. Therefore drag is a function of $v^2$, i. e., air speed squared. For representing this relationship the potentiometer 43 is appropriately contoured and energized at its opposite terminals by a voltage $-v^2$ taken from the potentiometer 36 of the air speed system. The mid-part of potentiometer 43 is grounded through a resistance at the angle of attack where the drag coefficient $C_D(\alpha)$ is zero and slider contact 43a is connected by conductor 46 to the air speed amplifier 25. Accordingly, the derived voltage at contact 43a, since it varies with change in angle of attack generally according to the above relationship can be used as an input $D(\alpha)$ to the air speed amplifier. The gravity input (G) depending on the pitch of the aircraft involves additional servo systems that will be presently described.

The inputs to the angle of attack ($\alpha$) amplifier 41 will now be considered. The angle of attack servo is an integrating servo for obtaining the instant value of angle of attack from the time integration of velocities, such as $\omega_y$, affecting angle of attack. The gravity factor which as above pointed out is affected by climb and dive attitudes may be divided into two components which are fed to the angle of attack and air speed amplifiers 41 and 25 respectively. In practice these gravity inputs are 90° components, i. e. the air speed component is along the flight path and the angle of attack component is perpendicular thereto. In the present illustration the $v$ and $\alpha$ gravity components are derived from the potentiometers 47 and 48 of the "pitch" ($\theta$) servo system indicated, the pitch amplifier 50 in turn being energized to operate the two-phase motor 51, etc., from a "rate of pitch" system presently described. The pitch potentiometer 47 is suitably contoured (cosinusoidal in the present instance) and grounded at points 180° apart to represent both normal and inverted level flying, and the potentiometer is energized at points intermediate the grounded points by voltages $-E$ and $+E$ representing climb (negative) and dive (positive) gravity values respectively. The derived voltage at contact 47a represents the gravity component $G \sin \theta$ which (at low angles of attack) represents the effect of aircraft weight in increasing or decreasing thrust and hence air speed, and is led by conductor 49 to apparatus of Fig. 1 and by conductor 52 to the $v$ amplifier 25. The gravity component input of the $\alpha$ amplifier 41 can be represented as $$\frac{G \cos \theta}{v}$$

which gives this term the dimensional units of velocity as required by the integrating angle of attack servo. For the purpose of deriving this voltage, the pitch potentiometer 48 which is cosinusoidal as in the case of potentiometer 47 is energized by potentials from the air speed potentiometer 37 representing $$+\frac{1}{v}$$

and $$-\frac{1}{v}$$

The derived voltage at the contact 48a of potentiometer 48 (which is spaced 90° from contact 47a) represents the gravity component $$\frac{G \cos \theta}{v}$$

of which the numerator is the component to be supported by lift derived through angle of attack and is fed by conductor 53 to the $\alpha$ amplifier 41.

Referring again to the angle of attack system, the lift L (in pounds) may be expressed by the formula $$L = C_E(\alpha)\frac{\rho v^2 s}{2}$$

where $C_L(\alpha)$ is the coefficient of lift. Therefore lift also is a function of air speed squared and depends on the type of aircraft simulated. Accordingly the potentiometer 44 of the $\alpha$ system for determining lift is appropriately contoured for the coefficient $C_L(\alpha)$ of the particular airplane simulated and is grounded through a resitance at its mid-portion at the value of angle of attack at which the lift coefficient is zero. If the potentiometer were energized by a voltage $v^2$, the derived brush E. M. F. would represent the acceleration of lift. By dividing this acceleration by air speed, the factor has the dimensions of velocity as required by the angle of attack integrating servo for the determination of instant attack angle. Hence potentiometer 44 is energized at its upper and lower terminals by voltages $-v$ and $+v$ respectively derived from the air speed potentiometer 35. The instantaneous positive value of $v$ may be suitably obtained by means of a 180° phase shifter as indicated. Accordingly the contact 44a of the potentiometer 44 derives a lift dependent voltage which is applied as an input to the $\alpha$ amplifier 41. There is also an input to the angle of attack system representing the angular rate of pitching and this input is derived from the force integrating servo system designated "rate of pitch" ($\omega_y$) from the potentiometer 59, the brush 59a of which selects a voltage directly proportional to the position of the $\omega_y$ shaft.

The inputs to the rate of pitch system include a so-called pitching moment input derived from the potentiometer 45 of the angle of attack system. Pitching moment is defined as the moment produced by a force acting about the $y$ axis a given distance from the center of gravity CG, Fig. 4, tending to change the pitch attitude. This pitching moment may be expressed as $$C_M(\alpha)\frac{\rho v^2 s}{2}$$

and is a function of air speed squared. The potentiometer 45 is grounded through a resistance at its mid-portion at the angle of attack where the pitch moment is zero and is energized by voltages $-v^2$ and $+v^2$ as in the case of the elevator potentiometer, and is also appropriately contoured so that the pitching moment voltage at the slider contact 45a varies according to the desired characteristics of the particular airplane. This voltage is fed by conductor 54 to the rate of pitch amplifier 55. The other main input $M_D$ of amplifier 55 indicated represents the pitching moment in ft.-lbs. produced by the pilot-operated elevator control tending to cause pitch and is derived from the elevator potentiometer 17 that is in turn energized according to the square of air speed by voltages $+v^2$ and $-v^2$. The mid-portion of the potentiometer is grounded to represent approximately level flying or zero pitching moment. Accordingly the slider contact 17' of the elevator potentiometer selects a voltage that may be represented as the pitching moment ($M_D$) in foot-pounds and that is fed to the rate of pitch amplifier 55. It is to be noted that in the case of the foregoing circuits a positive (+) designated signal increases air speed, changes angle of attack, rate of pitch and pitch in the conventionally positive direction as may be seen from Fig. 4.

As in the previous servos, the output of amplifier 55 energizes a two-phase motor 56 for driving a feed-back generator 57 and operating the contacts 58a and 59a of potentiometers 58 and 59 through a suitable speed reducing mechanism 60. The linear potentiometer 58 is used to derive an input voltage representing centrifugal force for the $\beta$ amplifier 100, Fig. 1, and is therefore grounded at its mid-portion and energized according to air speed by voltages $+v$ and $-v$ so that the derived voltage $\omega_y \cdot v$ at the slider contact 58a is determined by the factors $v$ and $\omega_y$ and led by conductor 61 to apparatus shown in Fig. 1. Also the linear potentiometer 59 for supplying an input to the pitch ($\theta$) integrating system above referred to is energized by voltages $+E$ and $-E$ whereby the derived voltage at the slider contact 59a which is fed by conductor 62 to the $\theta$ amplifier is proportional to the rate of pitch, the time integrated value of which represents the pitch angle $\theta$ of the aircraft. This integrating operation is performed by means of the pitch motor 51 and feed-back generator 63, the potentiometers 47 and 48 above described providing voltages at slider contacts 47a and 48a that not only represent the two gravity components above referred to but also the instant angle of pitch. Accordingly the pitch element of an attitude gyro can be directly operated from the pitch motor 51 if desired.

It is also to be noted that the variation in the various angular rates and forces and moments such as gravity, lift, centrifugal force, thrust, drag, pitching moment and the like are accomplished by the change in contact brush position on the respective potentiometers together with variation in the potentiometer energizing voltage, whereas the relative magnitude or effect of each of the aforesaid rates, forces and moments is determined by the value of the input resistance to the various amplifiers. As a specific example, the relative magnitude of lift is affected by the values of air density ($\rho$) and the constant surface factor $$\frac{s}{2}$$

In the present illustration $\rho$ is also considered a constant and hence these terms determine the resistance value of the input indicated at $C_L$ to the amplifier 41. Lowering the value of the resistance increases the relative magnitude of the above constant.

The use of the feed-back generators for rate control is particularly important, the pitch servo integrating system serving as an important example. If the motor 51 alone were relied upon to perform the pitch integrating operation the natural inertia of the driving mechanism would introduce such a large error that from a practical standpoint the system would not be useful. However, with the feed-back generator connected in the system as shown, the generated feed-back voltage $E_{fb}$ constitutes an input for the pitch amplifier and is of such phase relation to the summed or resultant input signal that it opposes the same, i. e. in the manner of degenerative or negative feed-back. With large gain in the control amplifier the speed of the motor according to well known principles is therefore caused to have a linear speed response to the magnitude of the input signal, i. e. rate of pitch voltage, without lag or overshooting, thereby integrating both high and low rates of pitch with equal precision. It will be apparent that when the main input signal is reversed so as to operate the motor and generator in the opposite direction, the phase of the generated feed-back voltage is likewise reversed to oppose the input signal as before.

Referring again to Fig. 2, as the throttle potentiometer contact 15' is moved downward for example toward the open throttle position, the derived input thrust voltage T for the amplifier 25 increases thereby unbalancing the air speed servo system and causing the servomotor 26 to run in a direction moving the potentiometer contacts 35a, 36a and 37a upward as shown toward increased air speed so that the following takes place in the air speed potentiometer system: (1) the derived air speed voltage $v$ increases, (2) the derived $v^2$ voltage increases as the square of air speed, (3) the derived voltage representing the reciprocal of air speed $$\frac{1}{v}$$

decreases and (4) the air speed meter 34 indicates a higher air speed value. However the air speed cannot increase indefinitely because the constant coefficient drag increases with $v^2$ as does the $C_D(\alpha)$ drag. Also at the same time, the thrust, which varies with the reciprocal of air speed, decreases as the new equilibrium is reached.

Now, as the air speed increases, the angle of attack system is in turn unbalanced since the input voltages derived from the potentiometer 59 of the rate of pitch system and from the potentiometer 44 of the angle of attack system, both of which are indirectly or directly dependent on the air speed $v$, are now increased. Also the gravity input from the pitch system is changed as will presently be described. Accordingly, the $\alpha$ servomotor 40 starts running in a direction searching for a new balance position and finally moving the potentiometer contacts 43a, 44a and 45a downward toward decreased angle of attack indication. As this operation progresses the derived voltages from the three $\alpha$ potentiometers 43, 44 and 45 are used as follows:

(1) The derived drag voltage (negative) from potentiometer 43 is used as in input D($\alpha$) for the air speed amplifier and increases in magnitude so as to oppose the increased thrust voltage (positive) derived from the higher throttle setting above referred to.

(2) Since the wing lift of an aircraft must balance any centrifugal force and weight component acting perpendicular to the wing, the derived lift velocity voltage ($C_L$) from potentiometer 44 must balance both the gravity factor $$\frac{G \cos \theta}{v}$$

and the pitching velocity factor $\omega_y$. Assuming that the plane was initially in level flight, the angular pitching velocity is zero and hence the tendency of increased air speed is to reduce the angle of attack which will tend to become more negative. This tendency is opposed by a change in pitching moment affecting the position of brush 59a through amplifier 55 as described immediately following.

(3) The derived pitching moment voltage from potentiometer 45 which is an input ($C_M$) for the rate of pitch amplifier 55, becomes more positive with decreasing angle of attack and thereby causes an unbalance at the rate of pitch servo system in turn causing the contacts 58a and 59a to move upward to select at contact 59a an angular pitching velocity voltage $\omega_y$ for the amplifier 41 which produces an equilibrium restoring tendency at the $\alpha$ servo. Also the upward movement of contact 59a results in an increased $\omega_y$ input voltage for the pitch integrating servo system amplifier 50. Accordingly, all four servo systems are now functioning in a combined computing and integrating operation necessary to determine the new air speed reading and pitch attitude.

As the pitch system is unbalanced toward a position of more positive pitch, i. e. climb, the derived voltages at contacts 47a and 48a of potentiometers 47 and 48 representing the gravity input components for the $v$ and $\alpha$ amplifiers respectively vary in magnitude, the $v$ component increasing and the $\alpha$ component decreasing in the present instance as it will be apparent that if the aircraft nose were pointed toward the zenith the gravity component in the direction of aircraft movement would then represent $-G$ and the gravity component perpendicular to the wings, i. e. the $\alpha$ servo component would be zero. At intermediate aircraft attitudes the components are vectorially resolved.

The negative gravity component ($-G \sin \theta$) to the air speed servo tends to reduce the maximum velocity the aircraft will reach with the increased throttle setting. At the same time the wing lift required is decreased due to decrease of input $G \cos \theta$ at the $\alpha$ amplifier 41. This allows a further reduction in angle of attack and additional reduction in the negative pitching moment voltage ($C_M$) to the rate of pitch amplifier 55 which in turn produces a still greater upward movement of the contacts 58a and 59a, thus increasing the effect on the pitch and angle of attack servos until finally these servos have overrun and have produced too great a change in the weight components for equilibrium. Consequently there is dropping off of air speed. This in turn results in a decreased lift voltage ($C_L$) at the $\alpha$ amplifier 41 so that the angle of attack is increased and a larger negative pitching moment voltage is produced at potentiometer 45 for the $\omega_y$ amplifier 55. The $\omega_y$ contacts 58a and 59a now move downward to control the pitch integrating servo so as to reduce the pitch attitude until it finally becomes negative. The $G \sin \theta$ component to the air speed servo has now become positive, thereby aiding thrust so that the air speed once more increases and the cycle reverses eventually damping itself to a final equilibrium position consistent with the new throttle setting. The pitch servo can be used to operate the pitch element of an attitude gyro as indicated.

In the foregoing manner the true damped wave path for vertical oscillation or "fugoid" of aircraft is accurately reproduced so that the simulation achieved is highly realistic. The degree of damping of the wave path is dependent on the choice of the circuit constants including percentage of velocity feed-back, gear ratios, relative input magnitudes and the positions of potentiometer center taps. The "stall" characteristic is also determined by these factors.

It has been assumed during the above explanation that the throttle setting only has been changed and that the elevator control remained in normal level flight or neutral position. When the elevator control is adjusted, a derived voltage corresponding to the turning moment is used for controlling a force integrating servo, i. e. the rate of pitch ($\omega_y$) servo from which is derived a voltage corresponding to the angular rate of pitching. This pitching velocity voltage ($\omega_y$), is an input controlling the angle of attack servo for deriving a pitching moment input voltage of opposite sense but equal in magnitude to the first or elevator moment voltage. Also, this same integrated moment or pitching velocity voltage ($\omega_y$) controls the derivation of another rate input voltage representing the effect of lift on a rate and which has a polarity of opposite sense and builds up to offset the effect of the originating rate of change of $\alpha$ voltage. A damping term to change of pitch, namely $-\omega_y \cdot v$ is derived from the contact 94a of optentiometer 94 of the $\omega_y$ servo. This illustrates in general how a balance is established between rate of pitch and angle of attack.

During the above described dive control operation the $\alpha$ system seeks a balance depending on the inputs representing respectively rate of pitching from the rate of pitch system and the gravity component from the pitch system on the one hand, and the lift velocity voltage from the changed angle of attack on the other hand, the resultant of these inputs operating the $\alpha$ motor 40 in the positive or negative direction as the case may be and becoming balanced when the rate of pitch and the pitch systems become stabilized.

It will be seen from the above explanations that two integration operations are involved to determine either the aircraft angle of attack or the aircraft attitude in pitch; the first integration is that of acceleration (force) to velocity and then velocity to angle.

The above description of servo operation is concerned mainly with a "vertical system," i. e. movement about the $y$ axis of the aircraft. Movement about the $z$ axis (yawing) and about the $x$ axis (roll) will now be considered. A rate of yaw ($\omega_z$) servo system is supplied with a number of inputs including an A. C. voltage representing turning moment ($M_t$) from the rudder potentiometer 18. This potentiometer, Figs. 1 and 2, is grounded at its mid-portion to represent straight line flight and is energized by voltages representing air speed squared values $+v^2$ and −$v^2$ at the upper and lower terminals respectively. Accordingly the desired voltage at the rudder controlled contact 18′ corresponds to the yawing effect or turning moment produced by right or left rudder and represents the input $m_t$ for the $\omega_z$ amplifier 65. A change in the rudder voltage unbalances the $\omega_z$ system, assuming that there is no compensating change in the other inputs, so that the output of amplifier 65 causes the two-phase motor 66 to operate the potentiometer contacts 67a and 68a toward a new position of balance on the respective potentiometers 67 and 68, i. e. upward in case of a right rudder for example. The potentiometer 68 has a grounded center tap and is energized at its opposite terminals by voltages representing $+v$ and $-v$ so that the voltage derived at the contact 68a represents $\omega_z \cdot v$, i. e. centrifugal force. This voltage is led by conductor 64 to the apparatus of Fig. 1. The potentiometer 76 derives a voltage at contact 76a corresponding to the coupling effect of yaw on roll and so provides an input (conductor 76b) for this purpose to the roll servo amplifier 77. As in the previously described servo systems the motor drives a feed-back generator 69 and operates the potentiometer contacts through a gear box 68a and mechanical connections indicated at 69b.

The other inputs for the amplifier 65 include a voltage representing a damping factor, i. e. the reaction force $\beta \cdot v^2$ of the fuselage to yawing, that is derived from a side-slip angle ($\beta$) servo system so indicated and the feed-back voltage $E_{fb}$ from the generator 69 for insuring operation of the motor 66 at the proper rate for integration of the rudder and side force voltages to angular velocity of yaw.

The $\beta$ system comprises an integrating servo amplifier 70, the output of which operates the two-phase servomotor 71 and the velocity controlling feed-back generator 72, to displace through the gear box 73 and mechanical connections the slider contact 74a on the potentiometer 74. The potentiometer 74 is grounded at its midportion and energized at its upper and lower terminals by potentials $-v^2$ and $+v^2$ respectively so that as $\beta$ increases or decreases the derived voltage representing the reaction force of the fuselage or damping factor varies accordingly. This voltage is directed by conductor 75 to the $\omega_z$ amplifier 65.

The inputs for the $\beta$ amplifier 70 include the feed-back voltage $E_{fb}$, a voltage representing a gravity factor taken from the roll ($\phi$) servo system presently described and a voltage representing $\omega_z$ derived from the potentiometer 67 of the $\omega_z$ system. This potentiometer is grounded at its mid-portion and energized at its upper and lower terminals by potentials $-E$ and $+E$ respectively, so that the voltage at contact 67a which is led by the conductor 78 to the $\beta$ amplifier corresponds to $\omega_z$.

The gravity acceleration force acting in the conventional $x$—$y$ plane of the aircraft, Fig. 4, in the direction of side-slip is resolved as $$G \sin \phi \cos \theta$$

where $\phi$ is the angle of roll and $\theta$ is the angle of pitch. Since the side-slip angle $\beta$ is derived by the time-integration of angular rate, this gravity acceleration factor $G \sin \phi \cos \theta$ is divided by air speed to provide a factor having rate dimensions. To derive the factor $$\frac{G \sin \phi \cos \theta}{v}$$

the brush voltages of the previously described potentiometer 48 of the pitch servo energize the cosinusoidal resolver 90 of the roll servo to provide the factor at contact 90a.

It will therefore be seen that the $\beta$ system involves as in practice the essential factors of gravity, and the rate of rotation about the vertical axis of the aircraft, and the $\omega_z$ system involves the factors of turning moment due to rudder control and fuselage reaction or damping components. The $\beta$ servo can conveniently be used as indicated for operating a ball-crank indicator 79.

The integrating servo system used for indicating the roll ($\phi$) attitude includes the summing amplifier 77 that is responsive to the derived aileron voltage from potentiometer 16, Figs. 1 and 2. The voltage from potentiometer contact 16′ is a velocity voltage and is led by conductor 20 to amplifier 77 to represent the rate of roll. The other input is derived from the yaw system and constitutes the coupling factor between yaw and roll. The roll servo motor-generator set 80, 81 is connected to a gear reducer 82 for operating the three contacts 83a, 83b and 83c respectively of a cosinusoidal potentiometer 83 having the same general design as those used in the pitch servo system. The terminals of potentiometer 83 are energized by opposite fixed voltages $+E$ and $-E$ respectively for representing gravity ($G$). The contacts are all secured to the servo shaft indicated at 84 for gang operation, the contacts 83b and 83c being angularly spaced 90° and 180° respectively from contact 83a so that voltages representing gravity components along the Z axis during roll may be derived at contacts 83a and 83c representing cosine functions of opposite sign, namely $+G \cos \phi$ and $-G \cos \phi$, and the voltages derived at contacts 83b and 83bb may represent sine functions of opposite sign, namely $+G \sin \phi$ and $-G \sin \phi$. These sine function voltages energize the pitch system potentiometer 130 by leads 131 and 132 so that the derived voltage at slider contact 130a represents $G \cos \theta \sin \phi$, the gravity component along the Y axis during roll. This voltage from contact 130a is led by conductor 85 to apparatus shown in Fig. 1 for computing force reaction.

For introducting the pitch correction factor, the potentiometer 86 of the pitch system is energized from the roll system and to this end the derived voltages $+G \cos \phi$ and $-G \cos \phi$ from contacts 83a and 83c respectively of the $\phi$ potentiometer 83 are used for energizing conductors 87 and 88 and the corresponding terminals of the $\theta$ cosinusoidal potentiometer 86. Thus the derived voltage at contact 86a of this potentiometer represents the function $G \cos \phi \cos \theta$ which is the gravity component along the Z axis of the aircraft resolved for roll and pitching. The contact 86a is connected by conductor 89 to the aforesaid apparatus of Fig. 1.

The pitch potentiometer 48 which is energized according to the reciprocal of air speed is provided with a second contact 48b spaced 180° from contact 48a so that the voltages derived at the respective slider contacts represent $$+\frac{G}{v} \cos \theta$$

and $$-\frac{G}{v} \cos \theta$$

the former also being an input for the $\alpha$ servo above described. These voltages are led by conductors 91 and 92 to the input terminals of the roll cosinusoidal potentiometer 90 so that the voltage derived therefrom at the slider contact 90a represents the gravity factor $$\frac{G}{v}\sin\phi\cos\theta$$

this voltage being led by conductor 93 to the β system above referred to.

Now if it be assumed that the pilot puts the rudder hard to the right for example, the rudder moment input for the $\omega_z$ amplifier increases to the maximum amount, thereby unbalancing the $\omega_z$ system and causing the motor 66 to move the potentiometer contacts 67a and 68a upward as the system searches for a new balance position corresponding to the proper rate of yaw. As the derived potentiometer voltages change in magnitude, the β system becomes unbalanced by the increasing angular rate factor $\omega_z$. Accordingly the β system, assuming for the present that the roll angle $\phi$ has not changed, operates to indicate side-slip, the motor 71 in this instance moving the contact 74a downward in the direction corresponding to a "ball to left" position of the well-known ball-bank indicator, i. e. a "skidding" indication due to insufficient banking. This condition can be corrected by increasing the roll angle $\phi$ thereby increasing the magnitude of the gravity component input $$\frac{G}{v}\sin\phi\cos\theta$$

so as to counterbalance the angular rate input $\omega_z$. When these two inputs are in proper relation the β system is balanced for the condition of zero side-slip angle with the contact 74a at the center or no voltage position and the ball of the ball-bank indicator centered. The voltage derived at contact 74a is used as previously described as an input representing damping for the $\omega_z$ amplifier tending to damp side-slip.

The gravity components affecting side-slip according to the pitch and roll angles above referred to are diagrammatically illustrated by Fig. 4 wherein an airplane P is shown in a combined climb and right roll attitude, the pitch angle $\theta$ and the roll angle $\phi$ being measured between a horizontal plane defined by the fixed axes $X_0$ and $Y_0$ and the X and Y axes of the aircraft respectively. The vertical gravity or weight vector G from the center of mass can therefore be projected on the Y—Z plane of the aircraft as $G \cos \theta$, and this component in turn can be projected on the X—Y plane as $G \cos \theta \sin \phi$. This last component therefore represents the gravity component acting along the wing tending to cause side-slip. If this component exceeds the centrifugal force component, falling off or side-slip results; if it is less, the side-slip takes the form of "skidding."

It is to be noted that for any given rate of turning the centrifugal force $\omega_z \cdot v$ becomes a direct function of air speed. Accordingly, to execute a turn without side-slipping, the bank angle must be increased with increased air speed to have the term $G \cos \theta \sin \phi$ balance $\omega_z \cdot v$, or inversely to have the term $$\frac{G}{v}\cos\theta\sin\phi = \omega_z$$

This is an important simulation of actual aircraft.

By proper choice of damping input resistances, the feed-back inputs at the β and $\omega_z$ servos and gear ratios, the computing system may be made to oscillate as desired to represent lateral oscillation and damping of an aircraft.

Referring now to the vector diagram shown by Fig. 3, various centrifugal force and gravity component voltages above described are represented as vectors in relation to the X, Y and Z axes of the aircraft. These axes are assumed to be fixed with respect to the aircraft itself so that they rotate therewith and assume various attitudes of pitch ($\theta$) and roll ($\phi$) with respect to stationary reference horizontal and vertical planes. As previously indicated, the X axis is the nose-tail axis of the aircraft, the Y axis is the transverse axis extending in the direction of the wing and the Z axis is the normally vertical axis perpendicular to the X and Y axes. Thus the gravitational force G acting at the center of gravity (C. G.) of the aircraft, i. e. point of intersection of the axes, may be resolved into vector components along the X, Y and Z axes so that the X component is $G \sin \theta$, the Y component is $G \sin \phi$ and the Z component is $G \cos \phi \cos \theta$. The vector representing centrifugal force due to yawing ($\omega_z \cdot v$) is represented as acting along the Y axis in additive relation to the gravity component $G \cos \theta \sin \phi$, and the centrifugal force vector due to pitching ($\omega_y \cdot v$) is represented as acting along the Z axis in additive relation to the gravity component $G \cos \phi \cos \theta$. Also, a vector representing air speed acceleration $$\frac{dv}{dt}$$

may be represented as acting along the X axis in addition to the gravity component $G \sin \theta$. Accordingly the resultant of the vectors lying in the X—Z plane may be represented as $$R_{xz} = \sqrt{\left(G\sin\theta + \frac{dv}{dt}\right)^2 + (\omega_y \cdot v + G\cos\phi\cos\theta)^2}$$

This resultant vector $R_{xz}$ makes an angle $\Delta$ with the Z axis.

It will therefore be apparent that the resultant R of all vectors along the X, Y and Z axes and its angle with respect to the X—Z plane may be obtained by combining the resultant $R_{xz}$ with the sum of the Y axis components $G \sin \phi$ and $\omega_z \cdot v$. Thus $$R = \sqrt{(R_{xz})^2 + (G\cos\theta\sin\phi + \omega_z \cdot v)^2}$$

due to pitching ($\omega_y \cdot v$) is represented as acting It will be seen from Fig. 3 that the final resultant R makes an angle $\delta$ with the X—Z plane. Therefore for the correct direction of "seat-of-pants" reaction the pilot's station should be pitched to an angle $\Delta$ and banked to the angle $\delta$.

For the purpose of positioning the trainer T according to the aforesaid angles $\Delta$ and $\delta$, a pair of rotary transformers 95 and 96, Fig. 1, having null-positioned secondary windings are provided, the primary windings being energized by certain of the acceleration and gravity vector voltages and the secondary windings being servo-controlled. The rotary transformer 95 is used for the pitching function and has a pair of fixed primary coils 97 and 98 positioned in quadrature relation. The coil 97 is energized by a voltage corresponding to the combined X axis vector $$\left(G\sin\theta + \frac{dv}{dt}\right)$$

from the summing amplifier 99, the inputs of which, $G\sin\theta$ and $$\frac{dv}{dt}$$

are led from the flight computing apparatus of Fig. 2 by conductors 24 and 49. The other coil 98 is energized by a voltage from the summing amplifier 100 representing the sum of $\omega_y \cdot v$ and $G \cos \phi \cos \theta$, i. e. the combined centrifugal force and gravity vector along the Z axis, Fig. 2. The aforesaid Z axis voltages are led by conductors 61 and 89 from the flight computing apparatus of Fig. 2 to the amplifier 100 as previously indicated. The gain of amplifier 100 is adjusted by feed-back in well-known manner so that the output voltage applied to coil 98 bears the same scale factor relation to the voltage applied to coil 97 for like accelerations.

Thus the primary coils are energized respectively by voltages corresponding to the quadrature vectors along the X and Z axes. From this relationship it can readily be demonstrated that when the quadrature coils 101 and 102 of the rotatable secondary winding are angularly positioned with respect to the primary winding by the operating shaft 103 so that the induced voltage in the secondary coil 102 is zero, the induced voltage in the coil 101 then represents the resultant of the quadrature voltages in the primary winding, that is, the resultant $R_{xz}$, and in this position the shaft 103 assumes the aforesaid angle $\Delta$ as measured from a reference position representing a level attitude of the trainer T.

The terminals of the secondary coils are connected to external circuits through slip rings 104, 105 and 106 as follows: The coils 101 and 102 have a common terminal that is grounded through the slip ring 104, the coil 101 is connected through slip ring 105 by means of conductor 107 to the rotary transformer 96, and the null voltage coil 102 is connected through slip ring 106 to an amplifier 108 for energizing a null-positioning servo motor 109. The motor 109 is connected through a gear reducer 110 to the shaft 103 and is polarized for rotating the secondary winding 101—102 in a direction tending to cause decrease of the induced voltage in coil 102. Thus any voltage induced in the coil 102 causes energization of the motor 109 in a direction tending to reduce the coil voltage to zero. The motor 109 may be of the two-phase type above described, the connections for the reference voltage winding being omitted for simplifying the drawing.

Accordingly, since the angular position of shaft 103 represents the pitch reaction position of the pilot's station, this shaft may be coupled to shaft 12 of the trainer coupling to cause pitching movement of the trainer by suitable means such as a mechanical connection indicated by the dotted line 111 and position repeater means or torque amplifier generally indicated at 112.

The rotary transformer 96 which is used for the banking function has a fixed primary winding consisting of a pair of coils 113 and 114 in quadrature relation and a relatively rotatable secondary winding consisting of a pair of quadrature related coils 115 and 116 that are connected by a shaft 117 to a servo-positioning motor 118 as in the case of the rotary transformer 95. The primary coil 113 is energized from a summing amplifier 120 by a voltage representing the vector sum of $\omega_z \cdot v$ and $G \cos \theta \sin \phi$ along the Y axis, Fig. 2. The voltage inputs to the amplifier 120 representing the aforesaid vector components are led from the flight computing system of Fig. 2 by conductors 64 and 85. The other primary coil 114 is energized by a voltage representing $R_{xz}$ from the secondary coil 101 of the rotary transformer 95 through slip ring 105 and conductor 107. The gain of amplifier 120 is adjusted by feed-back in well-known manner so that the output voltage applied to coil 113 has the same scale factor relation to the voltage applied to coil 114 for like accelerations.

Thus the primary quadrature coils 113 and 114 are energized respectively by voltages corresponding to the combined force vectors along the Y axis and the vector representing the aforesaid resultant $R_{xz}$. As in the case of transformer 95, it can be demonstrated that when the quadrature coils 115 and 116 of the rotatable secondary winding are positioned by the servo operated shaft 117 so that the induced voltage in the coil 116 is zero, the induced voltage in the coil 115 then represents the resultant of the aforesaid primary voltages, and the shaft 117 assumes the angle $\delta$ as measured from a reference position representing a level attitude of the trainer T. The servo motor 118 is of the same character as the servomotor 109 of transformer 95 and is connected through a gear reducer 121 to the transformer shaft 117 so as to rotate the secondary winding to a null position as previously described. The motor 118 is energized from the null-positioned coil 116 through a slip ring connection 122 and amplifier 123. The coils 115 and 116 have a common terminal that is grounded through slip ring 124 and the coil 115 may be connected through a slip ring connection 125 to an indicating volt meter 126 that may be calibrated for example to represent the acceleration force acting on the pilot, thus giving a visual indication of the maneuver to the instructor.

Accordingly, since the transformer shaft 117 takes a position corresponding to the angle $\delta$, this shaft may be operatively connected to shaft 11 of the trainer yoke 9 by suitable means such as a mechanical connection indicated by the dotted line 127 and a position repeater or torque amplifier generally indicated at 128 for causing the trainer to be banked to the angle $\delta$. This banking control ($\delta$) together with the aforesaid pitching control ($\Delta$) at shaft 12 tilts the pilot's station at T so as to simulate realistically the direction of force reactions on the pilot during usual maneuvers.

It is sufficient for the purposes of the present invention to acquaint the pilot with the manner and not necessarily the degree in which he is affected by reaction forces. Accordingly, the direction rather than the exact magnitude of reaction forces such as are experienced by the pilot in actual flight is simulated.

It should be understood that this invention is not limited to specific details of construction and arrangement thereof herein illustrated, and that changes and modifications may occur to one skilled in the art without departing from the spirit of the invention.

What is claimed is:

1. In flight training apparatus having a pilot's station and simulated aircraft controls, means for moving said pilot's station so as to simulate "seat-of-pants" reaction experienced during actual flight maneuvers comprising means responsive to the operation of said controls for deriving respective control quantities for simulating flight conditions in corresponding flight maneuvers, computing means responsive to said control quantities and operable according to said flight conditions for determining the magnitude and direction of the resultant of simulated principal acceleration and gravity forces acting on the pilot with respect to the pitch and roll axes of the aircraft, and motive means responsive to said computing means for moving said pilot's station according to the respective directions of said resultant forces.

2. In flight training apparatus having a pilot's station and simulated aircraft controls, means for moving said pilot's station so as to simulate "seat-of-pants" reaction experienced during actual flight maneuvers comprising means responsive to the operation of said controls for deriving respective control quantities for simulating flight conditions in corresponding flight maneuvers, computing means responsive to said control quantities and operable according to said flight conditions for obtaining in turn quantities representing components of simulated centrifugal force and gravity respectively acting along reference axes, resolving means responsive to said component quantities for determining force-reaction angles equivalent in pilot reaction to corresponding pitch alnd bank attitudes of said pilot station, and motive means controlled according to the operation of said resolving means for causing pitching and banking of said pilot station according to said force-reaction angles.

3. In flight training apparatus having a pilot's station and simulated aircraft controls, means for moving said pilot's station so as to simulate "seat-of-pants" reaction experienced during actual flight maneuvers comprising electrical means responsive to the operation of said controls for deriving control voltages for simulating flight conditions in corresponding flight maneuvers, computing means responsive to said control voltages and operable according to said flight conditions for producing in turn potential representing the vector resultant of all simulated principal acceleration and gravity forces acting on the pilot with respect to the pitch and roll axes of the aircraft, and electrical motive means responsive to said potential for moving said pilot's station according to the respective direction of said resultant forces for simulating force reaction on the pilot.

4. In flight training apparatus having a pilot's station and simulated aircraft controls, means for moving said pilot's station so as to simulate "seat-of-pants" reaction experienced during actual flight maneuvers comprising means responsive to the operation of said controls for deriving control quantities for simulating flight conditions in corresponding flight maneuvers, means responsive to said control quantities and operable according to said flight conditions for producing potential representing components of forces acting on the pilot with respect to the pitch and roll axes of the aircraft, resolving means responsive to said potential for determining force-reaction angles made by resultants of said forces with respect to said axes respectively, and control means responsive to said resolving means for moving said pilot's station according to said angles respectively.

5. In flight training apparatus having a pilot's station and simulated aircraft controls, means for moving said pilot's station so as to simulate "seat-of-pants" reaction during flight maneuvers comprising means responsive to the operation of said controls for simulating flight conditions, potentiometer means operable according to said flight conditions for deriving voltages representing vector components of centrifugal force and gravity acting on the pilot along reference axes, resolving means responsive to said derived voltages for determining the direction angle of the resultant of forces with respect to the pitching axis of said pilot's station and for determining the direction angle of the resultant of forces with respect to the bank axis of said station, and motive means controlled according to the aforesaid direction angles for moving said pilot's station to pitch and bank attitudes simulating force-reaction on the pilot.

6. In flight training apparatus having a pilot's station and simulated aircraft controls, means for moving said pilot's station so as to simulate "seat-of-pants" reaction during flight maneuvers comprising means responsive to the operation of said controls for simulating flight conditions, means operable according to said flight conditions for deriving potentials representing vector components of centrifugal and gravity forces acting on the pilot with respect to the pitch and roll axes of the aircraft, voltage resolving means responsive to said derived potentials for adjustment to force-reaction angles made by resultants of said forces with respect to said axes respectively, and control means responsive to adjustment of said voltage resolving means for tilting said pilot's station according to said angles respectively.

7. In flight training apparatus having a pilot's station and simulated aircraft controls, means for moving said pilot's station so as to simulate "seat-of-pants" reaction during flight maneuvers comprising electrical means including voltage deriving means responsive to the operation of said controls for simulating flight conditions, voltage resolving means including a plurality of servo systems operable according to said flight conditions for deriving potentials representing vector components of centrifugal force and gravity respectively acting along aircraft reference axes, and electrical control means including other voltage resolving means responsive to said derived potentials for determining the force-reaction angles of resultant forces acting on the pilot with respect to the pitch and roll axes of the aircraft and for tilting said pilot's station according to said angles respectively.

8. In flight training apparatus having a pilot's station and simulated aircraft controls, means for moving said pilot's station so as to simulate "seat-of-pants" reaction during flight maneuvers comprising means responsive to the operation of said controls for simulating flight conditions, means operable according to said flight conditions for deriving voltages representing vector components of centrifugal force and gravity acting on the pilot along reference axes, resolving means including a pair of rotary transformers responsive to said derived voltages for determining respectively the direction angle of the resultant of forces with respect to the pitching axis of said pilot's station and the direction angle of the resultant of forces with respect to the bank axis of said station, said rotary transformers each having a movable winding that is adjustable to one of said direction angles, and means controlled according to the respective adjustments of said rotary transformers for tilting said pilot's station to corresponding pitch and bank attitudes.

9. In flight training apparatus having a pilot's station and simulated aircraft controls, means for moving said pilot's station so as to simulate "seat-of-pants" reaction during flight maneuvers comprising means responsive to the operation of said controls for simulating flight conditions, means operable according to said flight conditions for deriving voltages representing vector components of centrifugal force and gravity acting on the pilot along reference axes, resolving means including a pair of rotary transformers each having a primary quadrature winding responsive to said derived voltages for determining respectively the direction angle of the resultant of forces with respect to the pitching axis of said pilot's station and the direction angle of the resultant of forces with respect to the bank axis of said station, said rotary transformers also each having a movable secondary quadrature winding that is adjustable by null-control servo means to one of said direction angles, and position-repeater means controlled according to the respective adjustments of said secondary windings for tilting said pilot's station to corresponding pitch and bank attitudes.

10. In flight simulating apparatus having simulated flight controls, computing apparatus responsive to the operation of said controls for determining the magnitude or degree of flight conditions including air speed, rate of pitch, angle of attack and pitch attitude comprising means responsive to the operation of an elevator control for deriving a first voltage representing pitching moment, means for deriving voltages representing functions of air speed including the reciprocal of air speed, means for computing angle of attack including voltage deriving means energized by air speed voltages for deriving respectively a balancing voltage representing reaction pitching moment and a voltage representing angular velocity due to lift, summing means for algebraically summing said pitching moment and balancing voltages, including means energized according to the algebraic sum of said voltages for determining rate of pitch change and for deriving a voltage representing the same, means responsive to said rate of pitch voltage for determining pitch attitude, said pitch attitude determining means being operable to modify said reciprocal air speed voltage for representing angular pitching velocity due to gravity, said angle of attack computing means being jointly responsive to said last-named gravity pitching velocity voltage, said lift velocity voltage and said rate of pitch change voltage.

11. In flight simulating apparatus having simulated flight controls, computing apparatus responsive to the operation of said controls for determining the magnitude or degree of flight conditions including air speed, rate of pitch, angle of attack and pitch attitude comprising means responsive to the operation of one of said flight controls for deriving a first voltage representing a pitching moment, summing means responsive to changes in the values of said moment voltage and a balancing voltage representing reaction pitching moment to derive a voltage representing rate of pitching, means for deriving voltages representing different functions of air speed, means energized according to air speed function voltages and operable according to computed pitch attitude and angle of attack respectively for deriving additional voltages representing respectively angular pitching velocity due to gravity and to lift, means for algebraically summing said rate of pitching and pitching velocity voltages, integrating means operable according to the algebraic sum of said voltages for determining angle of attack and also for determining the aforesaid pitching velocity voltage due to lift, and integrating means responsive to the aforesaid rate of pitch voltage for determining pitch attitude of the aircraft and also for determining the aforesaid pitching velocity voltage due to gravity.

12. In flight simulating apparatus having simulated flight controls, computing apparatus for determining the magnitude or degree of simulated flight conditions including angle of attack, rate of pitch and pitch attitude comprising means responsive to the operation of one of said flight controls for deriving a first control voltage representing a pitching moment, means for deriving a control voltage representing air speed, angle of attack means utilizing said air speed voltage for deriving a balancing control voltage representing a reaction moment due to pitching, means for algebraically summing said first and balancing control voltages, means responsive to the combined effect of said summed voltage and air speed voltage for deriving another voltage for modifying in addition to said summed voltages the operation of said summing means in simulation of damping for determining rate of pitch, and integrating means operable according to changes in the modified sum of said control voltages for determining pitch attitude.

13. In flight training apparatus having a pilot's station and simulated aircraft controls, means for moving said pilot's station so as to simulate "seat-of-pants" reaction experienced during actual flight maneuvers comprising electrical means responsive to the operation of said controls for deriving respectively electrical control quantities for simulating flight conditions, electrical computing means responsive to said control quantities for obtaining in turn electrical quantities representing vector components of centrifugal force and gravity respectively acting along airchraft rerference axes for a simulated maneuver, resolving means responsive to said vector quantities for assuming positions representing the directions of resultants of said vector quantities, and means operatively connecting said resolving means and said pilot's station for tilting said station in pitch and bank attitudes respectively so that the station axes make the same angle with the vertical gravity vector as the aircraft axes would make in actual flight with the resultant vector of centrifugal forces and gravity for a corresponding maneuver.

14. In flight simulating apparatus having a plurality of simulated rudder, elevator and aileron aircraft controls, electrical computing means for determining the magnitude or degree of simulated flight conditions including airspeed, rate of yaw and side-slip comprising means responsive to the operation of said rudder control for deriving a voltage representing a yawing moment, means for deriving voltages representing functions of airspeed, means jointly responsive to the operation of said elevator and aileron controls including, voltage deriving means energized by one of said airspeed voltages for deriving a voltage representing gravity acceleration along the Y axis of the aircraft, summing means including a servo system responsive to said moment voltage, voltage deriving means energized by a fixed voltage and operable by said servo system for deriving another voltage representing angular velocity or rate of yaw, and integrating means including another servo system jointly responsive to said yaw rate voltage and said gravity acceleration voltage for indicating a relative position representing side-slip.

15. Aircraft training apparatus for ground training for simulating a pilot's "seat-of-pants"

reaction experienced in actual flight comprising simulated flight controls, a station simulating a pilot's cockpit, means for tilting said station in pitch, bank and roll attitudes, computing means responsive to the operation of said controls for producing control quantities representing the vector resultant of forces including gravitational and centrifugal forces, acting on a pilot during a flight maneuver, said computing means including means responsive to said control quantities for assuming positions representing the direction of said vector resultant, and means interconnecting said position and tilting means so as to position said station during a controlled simulated flight maneuver relative to the direction of vertical gravitational force whereby said gravitational force acts upon the pilot as would resultant forces of flight act on a pilot during a corresponding flight maneuver, as distinguished from positioning the station as an aircraft would appear to a ground-based observer during said corresponding maneuver.

16. In flight simulating apparatus having a movable pilot's station representing a cockpit and simulated aircraft controls, means for simulating flight force reactions as would be experienced by a pilot comprising computing means responsive to the operation of said controls for producing a plurality of control quantities representing force vectors involving certain acceleration flight forces, means responsive to said control quantities for determining the direction of the resultant of said vectors with respect to reference axes and means operatively related to said determining means for tilting said station so that the longitudinal and transverse axes of said station make the same angles with respect to a fixed vertical reference axis representing the direction of gravity as the resultant vector makes with said reference axes.

17. In flight training apparatus having a movable pilot's station representing a cockpit and simulated aircraft controls, means for simulating flight force reactions as would be experienced by a pilot comprising electrical computing means responsive to the operation of said controls for producing a plurality of control voltages representing force vectors involving acceleration flight forces and gravity, resolving means responsive to said control voltages for determining the direction of the resultant of said vectors with respect to reference axes and motive means operatively related to said resolving means for tilting said station so that the longitudinal and transverse axes of said station make the same angles with respect to a fixed vertical reference axis representing the direction of gravity as the resultant vector makes with said reference axes.

18. In flight simulating apparatus having a pilot's station and simulated aircraft controls, means for moving said pilot's station so as to simulate flight force reaction experienced during actual flight maneuvers comprising means responsive to the operation of said controls for deriving respective control quantities for simulating flight conditions in corresponding flight maneuvers, computing means responsive to said control quantities and operable according to said flight conditions for determining the magnitude and direction of the resultant of simulated principal acceleration forces acting on the pilot with respect to reference axes of the aircraft, and motive means operatively related to said computing means for moving said pilot's station according to the respective directions of said resultant forces.

19. In flight simulating apparatus having a pilot's station and simulated aircraft controls, means for moving said pilot's station so as to simulate flight force reaction experienced during actual flight maneuvers comprising means responsive to the operation of said controls for deriving respective control voltages for simulating flight conditions in corresponding flight maneuvers, electrical computing means responsive to said control voltages and operable according to said flight conditions for determining the magnitude and direction of the resultant of simulated principal acceleration forces acting on the pilot with respect to reference axes of the aircraft, and motive means operatively related to said computing means for moving said pilot's station according to the respective directions of said resultant forces.

20. In flight simulating apparatus having a movable pilot's station representing a cockpit and simulated aircraft controls, means for simulating flight force reactions as would be experienced by a pilot comprising electrical computing means responsive to the operation of said controls for producing a plurality of control voltages representing force vectors involving principal acceleration flight forces including gravity acting on the pilot along three reference axes, resolving means responsive to said control voltages for determining the direction of the resultant of said vectors with respect to said axes and means operatively related to said resolving means for tilting said station so that the longitudinal and transverse axes of said station make the same angles with respect to a fixed vertical reference axis representing the direction of gravity as the resultant vector makes with said reference axes.

21. In flight simulating apparatus having a movable pilot's station representing a cockpit and simulated aircraft controls, means for simulating flight force reactions as would be experienced by a pilot comprising electrical computing means responsive to the operation of said controls for producing a plurality of control voltages representing force vectors involving principal acceleration flight forces including gravity acting on the pilot along three reference axes, means for summing control voltages representing forces acting respectively along each axis, resolving means for determining the direction of the resultant of said vectors including a first resolver responsive to summed voltages representing forces acting along two of said axes for determining the direction of resultant thereof and a second resolver responsive jointly to the summed voltages representing forces acting along the third axis and to said first resolver for determining the direction of resultant of said third axis forces and the aforesaid two-axis resultant, and motive means operatively related to said resolvers for tilting said station so that the longitudinal and transverse axes of said station make the same angles with respect to a fixed vertical reference axis representing the direction of gravity as the resultant vector makes with said reference axes.

References Cited in the file of this patent

UNITED STATES PATENTS

| Number | Name | Date |
|---|---|---|
| 1,342,871 | Ruggles | June 8, 1920 |

(Other references on following page)

UNITED STATES PATENTS

| Number | Name | Date |
|---|---|---|
| 1,393,456 | Ruggles | Oct. 11, 1921 |
| 1,865,828 | Buckley | July 5, 1932 |
| 1,960,350 | Shackleton | May 29, 1934 |
| 2,099,857 | Link | Nov. 23, 1937 |
| 2,327,997 | Carmody | Aug. 31, 1943 |
| 2,346,838 | Haight | Apr. 18, 1944 |
| 2,366,603 | Dehmel | Jan. 2, 1945 |
| 2,407,325 | Parkinson | Sept. 10, 1946 |
| 2,408,081 | Lovell | Sept. 24, 1946 |
| 2,428,767 | Albert | Oct. 14, 1947 |
| 2,471,966 | Lukacs | May 31, 1949 |
| 2,485,292 | Kail | Oct. 18, 1949 |
| 2,494,508 | Dehmel | Jan. 10, 1950 |
| 2,510,500 | Hayes et al. | June 6, 1950 |

FOREIGN PATENTS

| Number | Country | Date |
|---|---|---|
| 553,139 | Great Britain | 1943 |